(12) United States Patent
Yamanaka

(10) Patent No.: US 11,979,083 B2
(45) Date of Patent: May 7, 2024

(54) DRIVER CIRCUIT AND POWER CONVERSION SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yuji Yamanaka, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/903,793

(22) Filed: Sep. 6, 2022

(65) Prior Publication Data

US 2023/0308007 A1  Sep. 28, 2023

(30) Foreign Application Priority Data

Mar. 23, 2022 (JP) ................. 2022-047558

(51) Int. Cl.
  *H02M 1/08* (2006.01)
  *H02M 1/00* (2006.01)

(52) U.S. Cl.
  CPC ........... *H02M 1/08* (2013.01); *H02M 1/0029* (2021.05)

(58) Field of Classification Search
  CPC .............................. H02M 1/0029; H02M 1/08
  USPC ........................................ 327/108, 109, 110
  See application file for complete search history.

(56) References Cited

U.S. PATENT DOCUMENTS

| 6,181,176 | B1  | 1/2001  | Nakano |
| 6,597,240 | B1* | 7/2003  | Walburger ............ H03F 3/2171 |
|           |     |         | 330/10 |
| 7,777,437 | B2  | 8/2010  | Kuroda et al. |
| 9,024,558 | B2  | 5/2015  | Sugie |
| 10,848,148 | B2* | 11/2020 | Butenhoff ................ H03K 7/08 |
| 2009/0045860 | A1* | 2/2009 | Bapat .................... H03K 17/166 |
|           |     |         | 327/170 |
| 2011/0248751 | A1* | 10/2011 | Sinow ................ H03K 17/6871 |
|           |     |         | 327/109 |
| 2013/0314020 | A1* | 11/2013 | Sugie ...................... H02P 6/085 |
|           |     |         | 327/170 |
| 2017/0012618 | A1* | 1/2017  | Krishna ................ H03K 17/166 |
| 2018/0269869 | A1* | 9/2018  | Mukhopadhyay ....... H02M 1/08 |
| 2019/0265744 | A1* | 8/2019  | Tajima ................. G01R 19/165 |

(Continued)

FOREIGN PATENT DOCUMENTS

| JP | 3175683 B2 | 6/2001 |
| JP | 2009-065485 A | 3/2009 |
| JP | 5961042 B2 | 8/2016 |

*Primary Examiner* — William Hernandez
(74) *Attorney, Agent, or Firm* — Kim & Stewart LLP

(57) ABSTRACT

A driver circuit includes a drive circuit, a monitoring circuit, and a control circuit. The drive circuit includes a first current source and drives a switching element when the first current source is connected to a control terminal of the switching element. The monitoring circuit monitors a period of time from a start to an end of a change in a voltage drop across the switching element. The control circuit controls a current value of the first current source based on the monitored period of time such that a slew rate of the voltage drop across the switching element approaches a target value.

17 Claims, 6 Drawing Sheets

(56) References Cited

U.S. PATENT DOCUMENTS

2021/0336611 A1\* 10/2021 Jiang ................... H03K 5/12
2022/0131561 A1\* 4/2022 Hsu .................. G06F 13/4072

\* cited by examiner ature the source of the source is connected to the node N1 and a drain is
DRIVER CIRCUIT AND POWER CONVERSION SYSTEM

CROSS-REFERENCE TO RELATED APPLICATION(S)

This application is based upon and claims the benefit of priority from Japanese Patent Application No. 2022-047558, filed Mar. 23, 2022, the entire contents of which are incorporated herein by reference.

FIELD

Embodiments described herein relate generally to a driver circuit and a power conversion system.

BACKGROUND

In a power conversion system including a switching circuit and a driver circuit, a switching element in the switching circuit is driven by a gate signal generated by the driver circuit. In such a power conversion system, it is desirable to have a driver circuit that drives the switching element in a proper manner.

DETAILED DESCRIPTION

Embodiments provide a power conversion system including a driver circuit that can drive a switching element in a proper manner.

In general, according to one embodiment, a driver circuit includes a drive circuit, a monitoring circuit, and a control circuit. The drive circuit includes a first current source and drives a switching element when the first current source is connected to a control terminal of the switching element. The monitoring circuit monitors a period of time from a start to an end of a change in a voltage drop across the switching element. The control circuit controls a current value of the first current source based on the monitored period of time such that a slew rate of the voltage drop across the switching element approaches a target value.

Hereinafter, a driver circuit according to an embodiment will be described in detail with reference to the attached drawings. The present disclosure is not limited to this embodiment.

Embodiment

Figure 1:
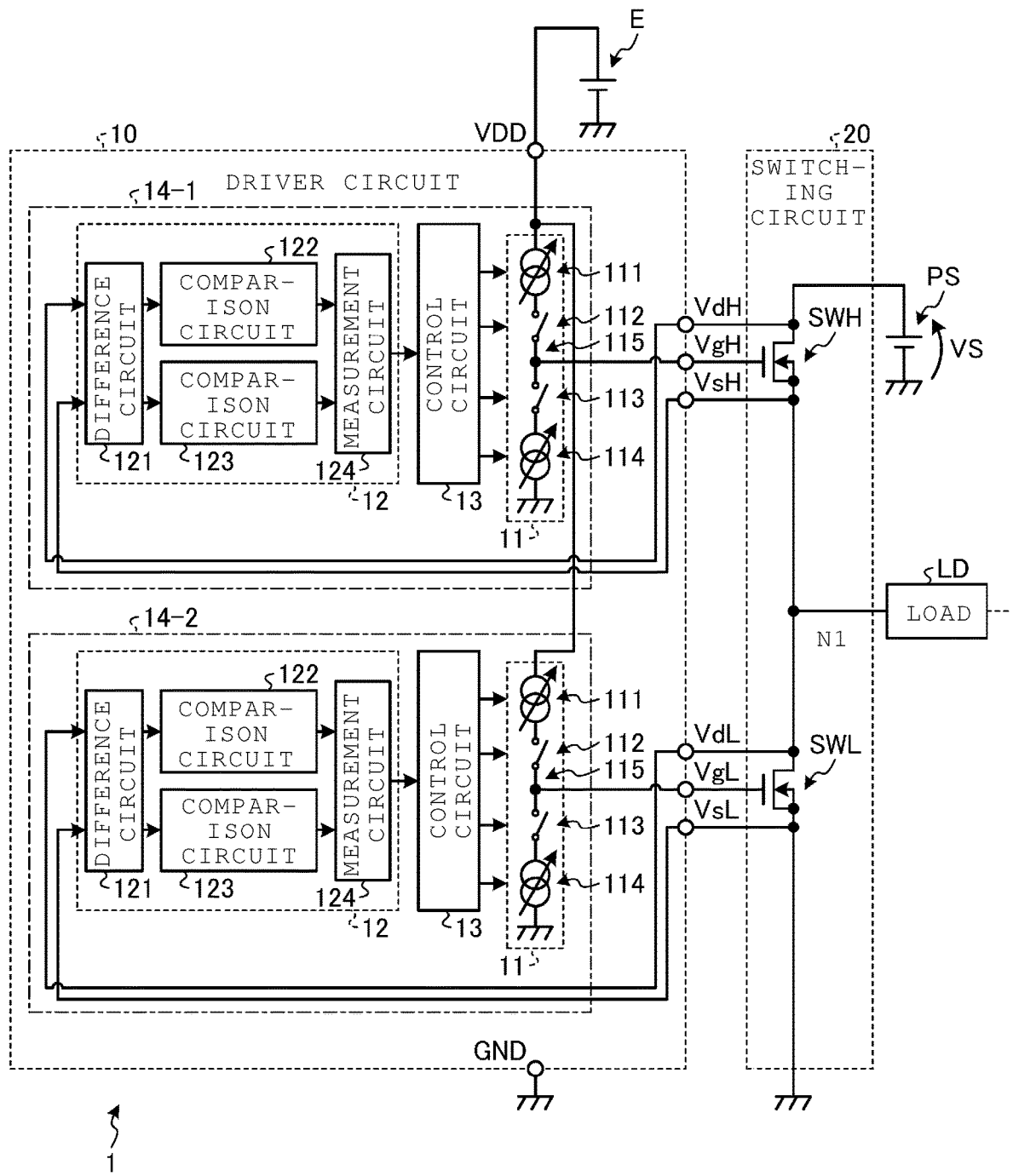
FIG. 1 is a circuit diagram illustrating a configuration of a power conversion system including a driver circuit according to an embodiment.

The driver circuit according to the embodiment is applicable to not only a switching circuit including a switching element but also a power conversion system. In this case, a configuration of the driver circuit that drives the switching element in a proper manner is implemented. A power conversion system 1 including a driver circuit 10 may be configured as illustrated in FIG. 1. FIG. 1 is a circuit diagram illustrating a configuration of the power conversion system 1 including the driver circuit 10.

The power conversion system 1 is connected between a power supply PS and a load LD. The power conversion system 1 generates a predetermined power using power from the power supply PS and outputs the generated predetermined power to the load LD. The power conversion system 1 may be a motor driver, the power supply PS a direct current power supply, and the load LD a motor. Alternatively, the power conversion system 1 may be a DC-DC converter, the power supply PS a direct current power supply, and the load LD a semiconductor integrated circuit.

The power conversion system 1 includes the driver circuit 10 and a switching circuit 20. The switching circuit 20 includes a switching element SWH on the high side and a switching element SWL on the low side. The driver circuit 10 includes a driver circuit 14-1 on the high side for driving the switching element SWH and a driver circuit 14-2 on the low side for driving the switching element SWL.

In the driver circuit 10, each of the driver circuits 14 includes a drive circuit 11, a monitoring circuit 12, and a control circuit 13. The drive circuit 11 includes current sources 111 and 114 and drives the switching element SW when the current sources 111 and 114 are connected to control terminals of the switching element SW. The monitoring circuit 12 monitors a period of time from a start to an end of a change in the voltage drop across the switching element SW. The control circuit 13 controls current values of the current sources 111 and 114 based on the monitored period of time such that a slew rate of the voltage drop across the switching element SW approaches a target value. As a result, the slew rate during change in the voltage drop across the switching element SW can be controlled to an appropriate range where EMI noise is reduced to be in an allowable range and power loss is reduced to be a request level or lower, and the switching element can be appropriately driven.

The switching circuit 20 is connected between the power supply PS and the load LD, and is connected between the driver circuit 10 and the load LD. The driver circuit 10 drives the switching circuit 20. The switching circuit 20 is driven to generate a predetermined power and supplies the generated predetermined power to the load LD.

The switching circuit 20 includes the switching element SWH on the high side and the switching element SWL on the low side. Accordingly, the driver circuit 10 includes the driver circuit 14-1 on the high side and the driver circuit 14-2 on the low side.

The switching element SWH on the high side is connected between a node N1 and the power supply PS, and the switching element SWL on the low side is connected between the node N1 and a reference voltage (for example, a ground voltage). The switching circuit 20 supplies the predetermined power to the load LD when the switching element SWH and the switching element SWL are complementarily driven.

The switching element SWH on the high side is connected between the node N1 and the power supply PS. The switching element SWH is, for example, an NMOS transistor where a source is connected to the node N1 and a drain is connected to the power supply PS. In the switching element SWH, a source, a drain, and a gate are connected to the driver circuit 14-1 on the high side of the driver circuit 10.

The switching element SWL on the low side is connected between the node N1 and the reference voltage (for example, a ground voltage). The switching element SWL is, for example, an NMOS transistor where a source is connected to the reference voltage (for example, a ground voltage) and a drain is connected to the node N1. In the switching element SWL, a source, a drain, and a gate are connected to the driver circuit 14-2 on the low side of the driver circuit 10.

Each of the switching elements SWH and SWL may be a PMOS transistor instead of the NMOS transistor. For example, by inserting an inverter between a terminal VgH and a gate of the PMOS transistor and inverting a logic of a signal from the terminal VgH, the same operation can be implemented. Alternatively, each of the switching elements SWH and SWL may be an insulated gate bipolar transistor (IGBT) instead of the NMOS transistor. In this case, the above description is applicable by replacing the term drain with the term collector replacing the term source with the term emitter.

In the switching element SWH, a source is connected to the monitoring circuit 12 of the driver circuit 14-1 through a node VsH of the driver circuit 10, a drain is connected to the monitoring circuit 12 of the driver circuit 14-1 through a node VdH of the driver circuit 10, and a gate is connected to the drive circuit 11 of the driver circuit 14-1 through a node VgH of the driver circuit 10.

In the switching element SWL, a source is connected to the monitoring circuit 12 of the driver circuit 14-2 through a node VsL of the driver circuit 10, a drain is connected to the monitoring circuit 12 of the driver circuit 14-2 through a node VdL of the driver circuit 10, and a gate is connected to the drive circuit 11 of the driver circuit 14-2 through a node VgL of the driver circuit 10.

The drive circuit 11 includes a current source 111, a switch 112, a switch 113, and a current source 114.

In the current source 111, one end is connected to an external power supply E through a power supply terminal VDD, the other end is connected to one end of the switch 112, and a control terminal is connected to the control circuit 13. The power supply E supplies a direct current voltage E.

In the switch 112, one end is connected to the current source 111, and the other end is connected to the gate of the switching element SW through a node 115 and the terminal VgH.

In the switch 113, one end is connected to the current source 114, and the other end is connected to the gate of the switching element SW through the node 115 and the terminal VgH.

In the current source 114, one end is connected to one end of the switch 113, the other end is connected to a reference voltage (for example, a ground voltage), and a control terminal is connected to the control circuit 13. The other end of the current source 114 is connected to an external reference voltage (for example, a ground voltage) through a reference terminal GND.

In the drive circuit 11 of the driver circuit 14-1 on the high side, when the switch 112 is maintained in an ON state and the switch 113 is maintained in an OFF state, the current source 111 causes a current to flow through the gate of the switching element SWH and the gate of the switching element SWH is charged. In the drive circuit 11, when the switch 112 is maintained in an OFF state and the switch 113 is maintained in an ON state, a current is absorbed from the gate of the switching element SWH in the current source 114 and charge is discharged from the gate of the switching element SWH. That is, the drive circuit 11 drives the switching element SWH by connecting the current source 111 or the current source 114 to the gate of the switching element SWH.

In the drive circuit 11 of the driver circuit 14-2 on the low side, when the switch 112 is maintained in an ON state and the switch 113 is maintained in an OFF state, the current source 111 causes a current to flow through the gate of the switching element SWL and the gate of the switching element SWL is charged. In the drive circuit 11, when the switch 112 is maintained in an OFF state and the switch 113 is maintained in an ON state, a current is absorbed from the gate of the switching element SWL in the current source 114 and charge is discharged from the gate of the switching element SWL. That is, the drive circuit 11 drives the switching element SWL by connecting the current source 111 or the current source 114 to the gate of the switching element SWL.

The monitoring circuit 12 monitors a period of time from the start to the end of a change in the voltage drop Vds across the switching element SW. The monitoring circuit 12 includes a difference circuit 121, a comparison circuit 122, a comparison circuit 123, and a measurement circuit 124.

The difference circuit 121 is connected between the switching circuit 20 and the comparison circuits 122 and 123. The difference circuit 121 acquires the voltage drop Vds across the switching element SW by receiving a source voltage and a drain voltage of the switching element SW and acquiring a difference between the source voltage and the drain voltage. The difference circuit 121 provides the voltage drop Vds across the switching element SW to each of the comparison circuit 122 and the comparison circuit 123.

Figure 2:
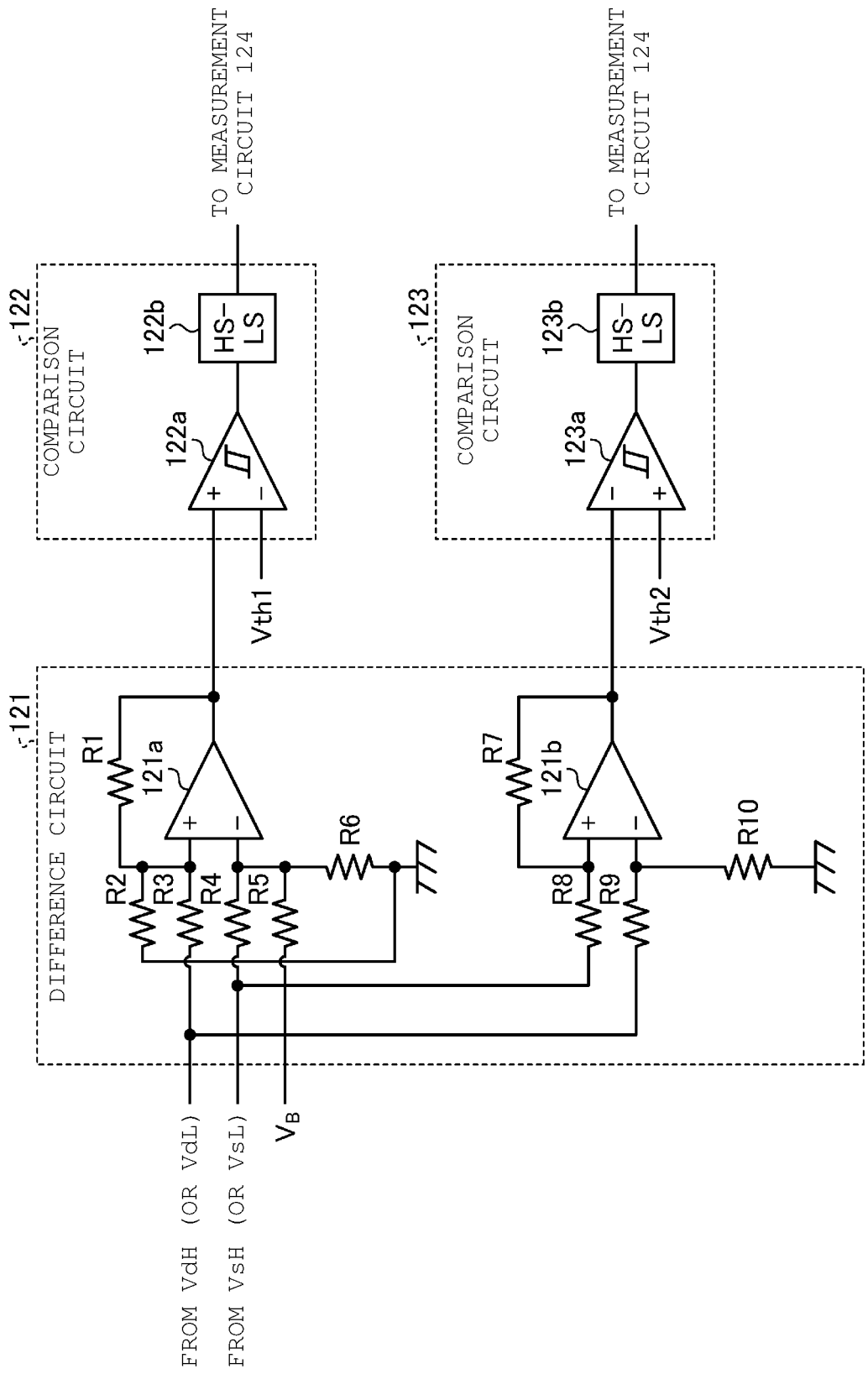
FIG. 2 is a circuit diagram illustrating configurations of a difference circuit and two comparison circuits in the embodiment.

The difference circuit 121 may be configured as illustrated in FIG. 2. FIG. 2 is a circuit diagram illustrating configurations of the difference circuit 121 and the two comparison circuits 122 and 123. The difference circuit 121 includes differential amplifiers 121a and 121b and resistor elements R1 to R10.

In the differential amplifier 121a, an inverting input terminal is connected to the drain of the switching element SW through the resistor element R3 and a terminal VdH (or VdL), and is connected to the reference voltage through the resistor element R2. A non-inverting input terminal is connected to the source of the switching element SW through the resistor element R4 and a terminal VsH (or VsL), is connected to a bias voltage $V_B$ through the resistor element R5, and is connected to the reference voltage through the resistor element R6. An output terminal is connected to the comparison circuit 122 and is connected to the inverting input terminal through the resistor element R1. As a result, the differential amplifier 121a acquires a difference between the drain voltage and the source voltage of the switching element and outputs the voltage drop Vds to the comparison circuit 122.

In the differential amplifier 121b, an inverting input terminal is connected to the source of the switching element SW through the resistor element R8 and the terminal VsH (or VsL), is connected to a bias voltage $V_B$ through the resistor elements R8, R4, and R5 and, and is connected to the reference voltage through the resistor elements R8, R4, and R6. A non-inverting input terminal is connected to the drain of the switching element SW through the resistor element R9 and the terminal VdH (or VdL), and is connected to the reference voltage through the resistor element R10. An output terminal is connected to the comparison circuit 123 and is connected to the inverting input terminal through the resistor element R7. As a result, the differential amplifier 121*b* acquires a difference between the drain voltage and the source voltage of the switching element SW and outputs the voltage drop Vds to the comparison circuit 123.

In the resistor elements R1 to R10, resistance values are the same as each other.

The comparison circuit 122 illustrated in FIG. 1 is connected between the difference circuit 121 and the measurement circuit 124. The comparison circuit 122 receives the voltage drop Vds across the switching element SW from the difference circuit 121. In the comparison circuit 122, a threshold voltage Vth1 is preset. The threshold voltage Vth1 corresponds to an H level of the voltage drop Vds across the switching element SW. The comparison circuit 122 compares the voltage drop Vds across the switching element SW to the threshold voltage Vth1. As a result, the comparison circuit 122 inverts the comparison result at the start timing of the transition from an H level to an L level of the voltage drop Vds across the switching element SW or at the end timing of the transition from the L level to the H level.

The comparison circuit 122 may be configured as illustrated in FIG. 2. The comparison circuit 122 includes a comparator 122*a* and a latch circuit 122*b*. In the comparator 122*a*, a non-inverting input terminal is connected to the difference circuit 121, and an inverting input terminal is connected to the threshold voltage Vth1. The comparator 122*a* receives the voltage drop Vds across the switching element SW from the difference circuit 121. When the voltage drop Vds across the switching element SW is higher than the threshold voltage Vth1, the comparator 122*a* outputs a H level, and when the voltage drop Vds across the switching element SW is lower than the threshold voltage Vth1, the comparator 122*a* outputs an L level.

The comparison circuit 123 illustrated in FIG. 1 is connected between the difference circuit 121 and the measurement circuit 124. The comparison circuit 123 receives the voltage drop Vds across the switching element SW from the difference circuit 121. In the comparison circuit 123, a threshold voltage Vth2 is preset. The threshold voltage Vth2 is lower than the threshold voltage Vth1. The threshold voltage Vth2 corresponds to an L level of the voltage drop Vds across the switching element SW. The comparison circuit 123 compares the voltage drop Vds across the switching element SW to the threshold voltage Vth2. As a result, the comparison circuit 123 inverts the comparison result at the start timing of a transition from an L level to an H level of the voltage drop Vds across the switching element SW or the end timing of the transition from the H level to the L level.

The comparison circuit 123 may be configured as illustrated in FIG. 2. The comparison circuit 123 includes a comparator 123*a* and a latch circuit 123*b*. In the comparator 123*a*, an inverting input terminal is connected to the difference circuit 121, and a non-inverting input terminal is connected to the threshold voltage Vth2. The comparator 123*a* receives the voltage drop Vds across the switching element SW from the difference circuit 121. When the voltage drop Vds across the switching element SW is higher than the threshold voltage Vth2, the comparator 123*a* outputs an L level, and when the voltage drop Vds across the switching element SW is lower than the threshold voltage Vth2, the comparator 123*a* outputs an H level.

The measurement circuit 124 illustrated in FIG. 1 measures a period of time from the start to the end of a change in the voltage drop across the switching element SW based on the comparison result of the comparison circuit 122 and the comparison result of the comparison circuit 123. When the voltage drop Vds across the switching element SW is to transition from an H level to an L level, the measurement circuit 124 measures a time Tfall from a timing at which the comparison result of the comparison circuit 122 is inverted to a timing at which the comparison result of the comparison circuit 123 is inverted. When the voltage drop Vds across the switching element SW is to transition from an L level to a H level, the measurement circuit 124 measures a time Trise from a timing at which the comparison result of the comparison circuit 123 is inverted to a timing at which the comparison result of the comparison circuit 122 is inverted. The measurement circuit 124 supplies the measurement result to the control circuit 13.

Figure 3:
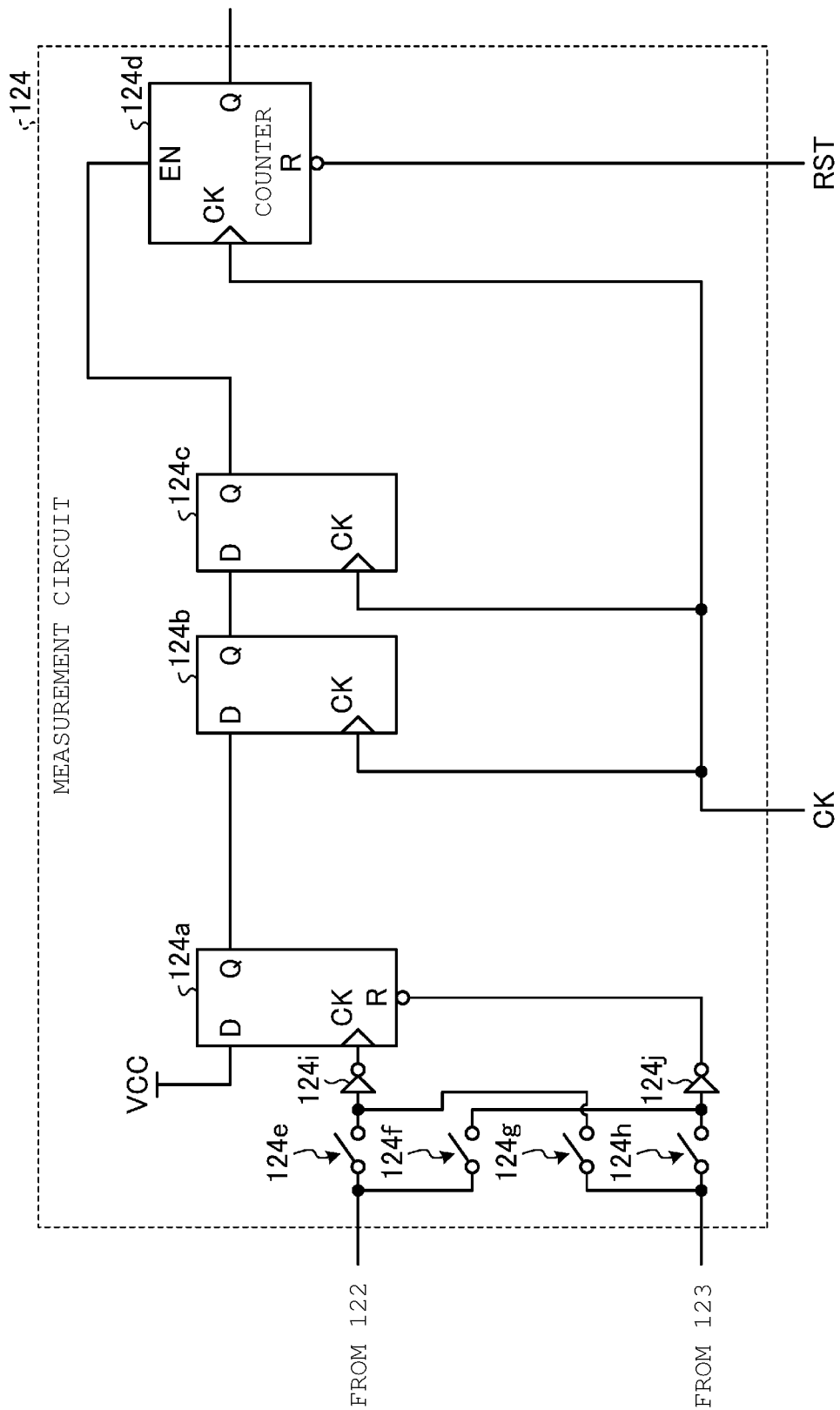
FIG. 3 is a circuit diagram illustrating a configuration of a measurement circuit in the embodiment.

The measurement circuit 124 may be configured as illustrated in FIG. 3. FIG. 3 is a circuit diagram illustrating a configuration of the measurement circuit 124. The measurement circuit 124 includes switches 124*e* to 124*h*, inverters 124*i* and 124*j*, a flip flop 124*a*, a flip flop 124*b*, a flip flop 124*c*, and a counter 124*d*.

In the switch 124*e*, one end is connected to the comparison circuit 122, and the other end is connected to the inverter 124*i*. In the inverter 124*i*, an input node is connected to the switches 124*e* and 124*g*, and an output node is connected to a clock terminal CK of the flip flop 124*a*. In the switch 124*f*, one end is connected to the comparison circuit 122, and the other end is connected to the inverter 124*j*. In the switch 124*g*, one end is connected to the comparison circuit 123, and the other end is connected to the inverter 124*i*. In the switch 124*h*, one end is connected to the comparison circuit 123, and the other end is connected to the inverter 124*j*. In the inverter 124*j*, an input node is connected to the switches 124*f* and 124*h*, and an output node is connected to a reset terminal R of the flip flop 124*a*.

The flip flop 124*a* is disposed between the switches 124*e* to 124*h* and the flip flop 124*b*. In the flip flop 124*a*, a data input terminal D is connected to a power supply voltage VCC, and an output terminal Q is connected to the flip flop 124*b*.

When the voltage drop Vds across the switching element SW is to transition from an H level to an L level, the switches 124*e* and 124*h* are maintained in an ON state, and the switches 124*f* and 124*g* are maintained in an OFF state. As a result, the comparison result of the comparison circuit 122 is supplied to the clock terminal CK of the flip flop 124*a* through the inverter 124*i*, and the comparison result of the comparison circuit 123 is supplied to the reset terminal R through the inverter 124*j*.

For example, at a timing at which the comparison result of the comparison circuit 122 changes from an H level to an L level, the flip flop 124*a* shifts the output from an L level to an H level. Next, the flip flop 124*a* maintains the output at an H level. Then, at a timing at which the comparison result of the comparison circuit 123 changes from an L level to a H level, the flip flop 124*a* resets and shifts the output from an H level to an L level.

When the voltage drop Vds across the switching element SW is to transition from an L level to a H level, the switches 124*e* and 124*h* are maintained in an OFF state, and the switches 124*f* and 124*g* are maintained in an ON state. As a result, the comparison result of the comparison circuit 123 is supplied to the clock terminal CK of the flip flop 124*a*, and the comparison result of the comparison circuit 122 is supplied to the reset terminal R.

For example, at a timing at which the comparison result of the comparison circuit 123 changes from an H level to an L level, the flip flop 124*a* shifts the output from an L level to an H level. Next, the flip flop 124*a* maintains the output at an H level. Then, at a timing at which the comparison result of the comparison circuit 122 changes from an L level to a H level, the flip flop 124a resets and shifts the output from an H level to an L level.

The flip flop 124b is disposed between the flip flop 124a and the flip flop 124c. In the flip flop 124b, a data input terminal D is connected to the output terminal Q of the flip flop 124a, a clock terminal CK receives a clock signal CK, and an output terminal Q is connected to the flip flop 124c.

The flip flop 124c is disposed between the flip flop 124b and the counter 124d. In the flip flop 124c, a data input terminal D is connected to the output terminal Q of the flip flop 124b, a clock terminal CK receives a clock signal CK, and an output terminal Q is connected to the counter 124d.

The counter 124d is disposed between the flip flop 124c and the control circuit 13. In the counter 124d, an enable terminal EN is connected to the output terminal Q of the flip flop 124c, a clock terminal CK receives a clock signal CK, a reset terminal R receives a reset signal RST, and an output terminal Q is connected to the control circuit 13.

During the period in which an enable signal received by the enable terminal EN is maintained at a H level, the counter 124d counts the number of pulses (the number of clocks) of the clock signal received by the clock terminal CK, and outputs the count value from the output terminal Q as the monitored period of time.

The control circuit 13 receives the monitored period of time from the monitoring circuit 12. The control circuit 13 controls current values of the current sources 111 and 114 based on the period of time monitored by the monitoring circuit 12 such that a slew rate of the voltage drop across the switching element SW approaches a target value.

For example, when the voltage drop Vds across the switching element SW is to transition from an H level to an L level, it is assumed that the count value of the counter 124d is CV1 and a period of the clock signal CK is Tck, the control circuit 13 can acquire a fall time Tfall of the voltage drop Vds across the switching element from the following Expression 1.

$$Tfall = CV1 \times Tck \qquad \text{Expression 1}$$

At this time, it is assumed that the threshold voltage of the comparison circuit 122 is Vth1 and the threshold voltage of the comparison circuit 123 is Vth2, the control circuit 13 can acquire a slew rate SRfall of the fall of the voltage drop Vds across the switching element SW from the following Expression 2.

$$SRfall = (Vth1 - Vth2)/Tfall \qquad \text{Expression 2}$$
$$= (Vth1 - Vth2)/(CV1 \times Tck)$$

When the slew rate SRfall is more than a target value SRt, the control circuit 13 reduces the current value of the current source 111 based on a deviation (SRfall−SRt). When the slew rate SRfall is less than the target value SRt, the control circuit 13 increases the current value of the current source 111 based on the deviation (SRfall−SRt). When it is assumed that the present current value of the current source 111 is I21 and the amount of correction is ΔI21, the control circuit 13 can control the value of a current $I_{111}$ of the current source 111 as illustrated in the following Expression 3.

$$I_{111} = I21 + \Delta I21 \qquad \text{Expression 3}$$

-continued
$$= I21 + k1 \times (SRfall - SRt)$$

In Expression 3, k1 represents a proportionality factor of the amount of correction ΔI relative to the deviation, for example, a negative value. The control circuit 13 generates a control signal for controlling the current $I_{111}$ of the current source 111 to the value represented by Expression 3 and supplies the generated control signal to a control node of the current source 111. As a result, the current value of the current source 111 can be controlled such that the slew rate SRfall approaches the target value SRt.

Alternatively, when the voltage drop Vds across the switching element SW is to transition from an L level to a H level, when it is assumed that the count value of the counter 124d is CV2 and a period of the clock signal CK is Tck, the control circuit 13 can acquire a rise time Trise of the voltage drop Vds across the switching element from the following Expression 4.

$$Trise = CV2 \times Tck \qquad \text{Expression 4}$$

At this time, when it is assumed that the threshold voltage of the comparison circuit 122 is Vth1 and the threshold voltage of the comparison circuit 123 is Vth2, the control circuit 13 can acquire a slew rate SRrise of the rise of the voltage drop Vds across the switching element SW from the following Expression 5.

$$SRise = (Vth1 - Vth2)/Trise \qquad \text{Expression 5}$$
$$= (Vth1 - Vth2)/(CV2 \times Tck)$$

When the slew rate SRrise is more than a target value SRt, the control circuit 13 reduces the current value of the current source 114 based on a deviation (SRrise−SRt). When the slew rate SRrise is less than the target value SRt, the control circuit 13 increases the current value of the current source 114 based on the deviation (SRrise−SRt). When it is assumed that the present current value of the current source 114 is I22 and the amount of correction is ΔI22, the control circuit 13 can control the value of a current $I_{114}$ of the current source 114 as illustrated in the following Expression 6.

$$I_{114} = I22 + \Delta I22 \qquad \text{Expression 6}$$
$$= I22 + k2 \times (SRrise - SRt)$$

In Expression 6, k2 represents a proportionality factor of the amount of correction relative to the deviation, for example, a negative value. The control circuit 13 generates a control signal for controlling the current $I_{114}$ of the current source 114 to the value represented by Expression 6 and supplies the generated control signal to a control node of the current source 114. As a result, the current value of the current source 114 can be controlled such that the slew rate SRrise approaches the target value SRt.

Figure 4:
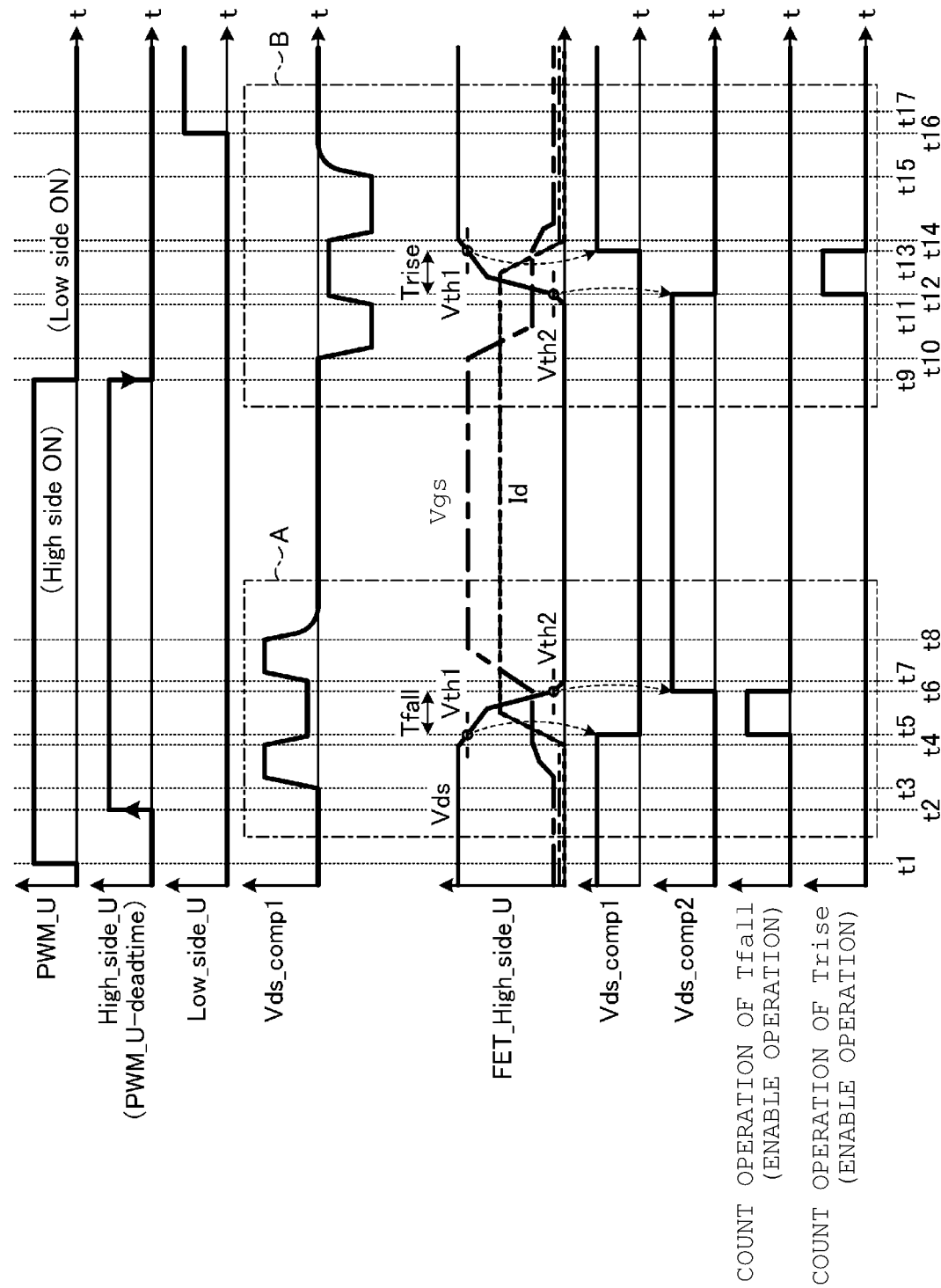
FIG. 4 is a waveform chart illustrating an operation of the driver circuit according to the embodiment.
Figure 5:
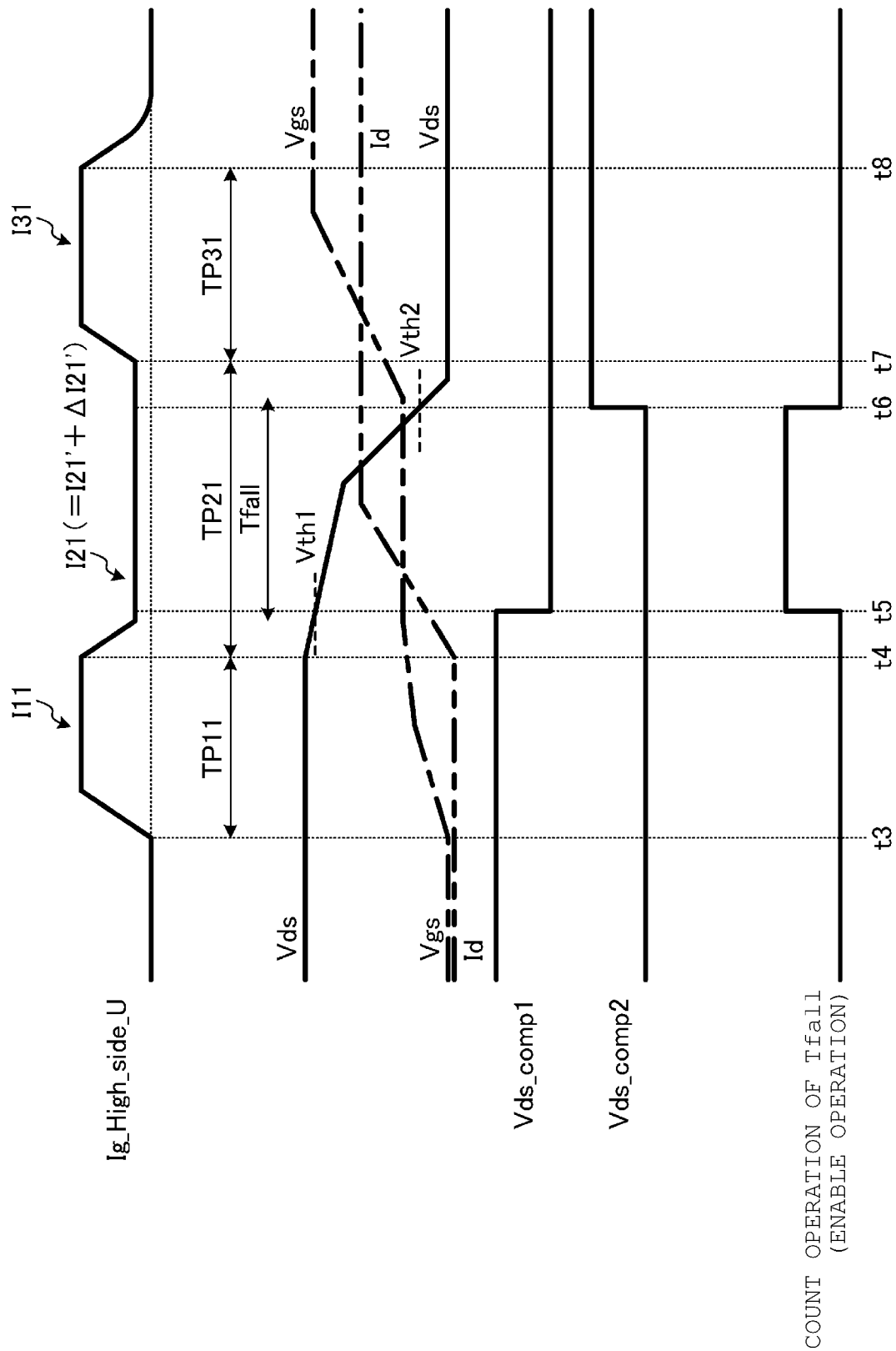
FIG. 5 is a waveform chart illustrating an operation of the driver circuit when a voltage drop across the switching element in the embodiment rises.
Figure 6:
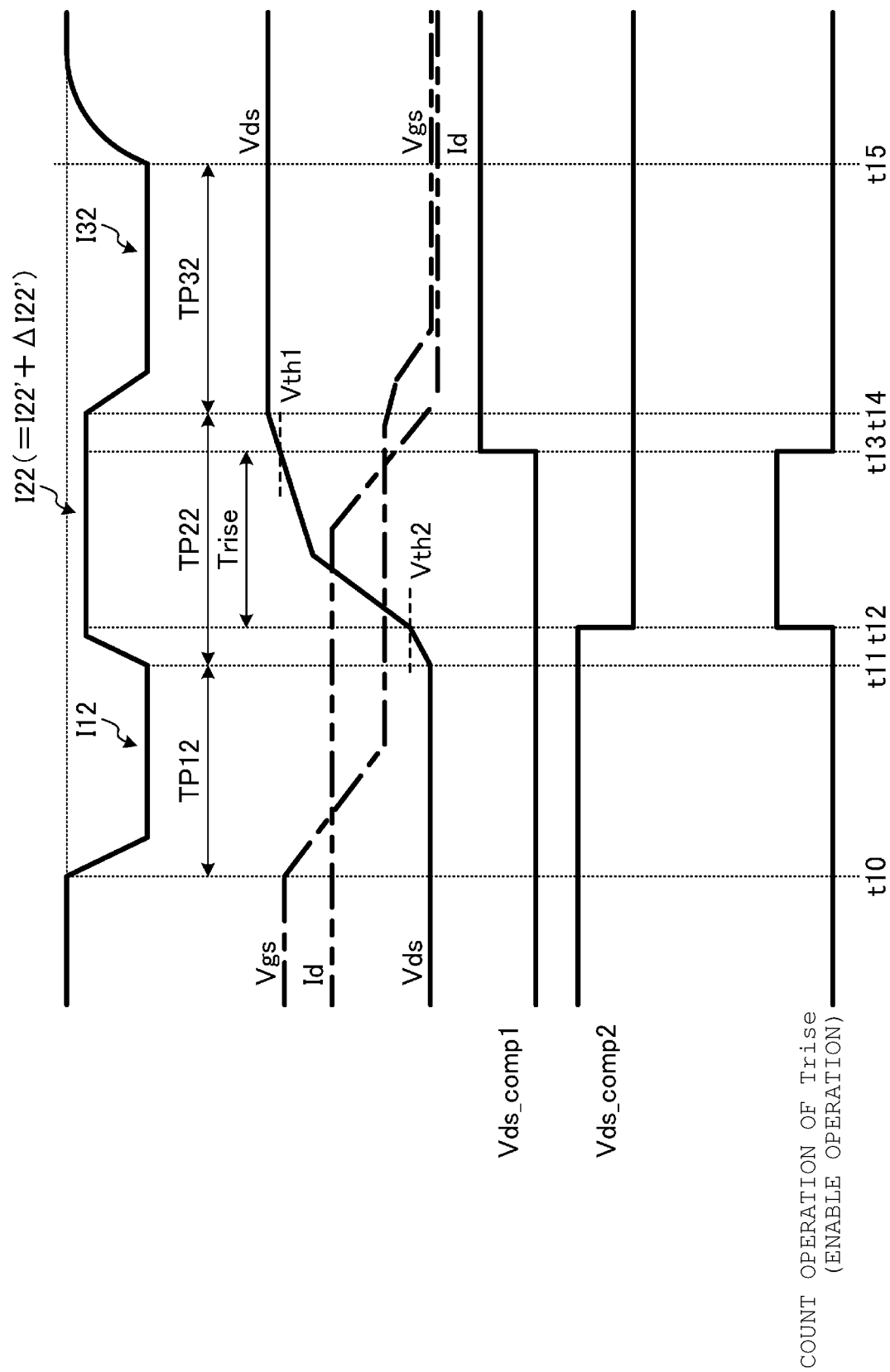
FIG. 6 is a waveform chart illustrating an operation of the driver circuit when the voltage drop across the switching element in the embodiment falls.

Next, an operation of the power conversion system 1 including the driver circuit 10 will be described using FIGS. 4 to 6. FIG. 4 is a waveform chart illustrating the operation of the power conversion system 1 including the driver circuit 10. FIG. 5 is a diagram illustrating a state where an A portion surrounded by a chain line in FIG. 4 is enlarged in a time direction. FIG. 6 is a diagram illustrating a state where a B portion surrounded by a two-dot chain line in FIG. 4 is enlarged in the time direction.

The driver circuit 10 periodically executes a switching operation on the switching circuit 20. The driver circuit 10 alternately repeats an operation of (High side ON) and an operation of (Low side ON) illustrated in FIG. 4. In the operation of (High side ON), the driver circuit 10 turns off the switching element SWL on the low side, and turns on the switching element SWH on the high side for driving. In the operation of (Low side ON), the driver circuit 10 turns off the switching element SWH on the high side, and turns on the switching element SWL on the low side for driving. Hereinafter, the driving of the switching element SWH on the high side will be mainly described.

At timing t1 illustrated in FIG. 4, a signal PWM_U transitions from an L level to an H level. Accordingly, the operation of (High side ON) starts. At this time, both of signals High_side_U and Low_side_U are maintained at an L level. Accordingly, both of the switching element SWH on the high side and the switching element SWL on the low side are maintained in an OFF state.

At timing t2, a signal High_side_U transitions from an L level to an H level. Accordingly, the monitoring circuit 12 and the control circuit 13 in the driver circuit 14-1 on the high side are activated. At this time, a period immediately before the timing t2 is secured as a dead time.

At timing t3, in the driver circuit 14-1 on the high side, the switch 112 is turned on and the switch 113 is turned off. The control circuit 13 controls the current source 111 such that the target value is I11. As a result, as illustrated in FIG. 5, the current $I_{114}$ of the current source 111 increases from zero to I11 and is maintained at I11. Accordingly, a current Ig_High_side_U flowing to the gate of the switching element SWH increases from zero to I11, and a gate-to-source voltage Vgs of the switching element SWH gradually increases. Next, the current Ig_High_side_U is maintained at I11. The gate-to-source voltage Vgs of the switching element SWH continuously increases. It is assumed that a direction in which the current Ig_High_side_U flows to the gate is a positive direction and a direction in which the current Ig_High_side_U flows from the gate is a negative direction. I11 is a current in the direction flowing to the gate, and is a positive current.

At timing t4, the control circuit 13 changes the target value from I11 to I21 and controls the current source 111 such that the target value is I21. An amplitude absolute value of I21 is less than an amplitude absolute value of I11. I21 is a value obtained adding an amount of correction ΔI21' that is previously acquired to an amount of current I21' during the previous fall of the waveform. Accordingly, the current Ig_High_side_U flowing to the gate of the switching element SWH decreases from I11 to I21, and the gate-to-source voltage Vgs of the switching element SWH more gently increases. Accordingly, the switching element SWH starts to be turned on, and the voltage drop Vds across the switching element SWH starts to decrease. Then, while the current Ig_High_side_U is maintained at I12, the gate-to-source voltage Vgs of the switching element SWH continuously gently increases, and the voltage drop Vds across the switching element SWH continuously decreases.

At this time, the monitoring circuit 12 monitors the start of a change in the voltage drop Vds across the switching element SWH. The difference circuit 121 acquires a difference voltage between a voltage of one end of the switching element SWH and a voltage of the other end of the switching element SWH. The comparison circuit 122 compares the difference voltage to the threshold voltage Vth1 and outputs an H level as a comparison result Vds_comp1. The comparison circuit 123 compares the difference voltage to the threshold voltage Vth2 and outputs an L level as a comparison result Vds_comp2.

At timing t5, the voltage drop Vds across the switching element SWH falls below the threshold voltage Vth1, and the comparison result Vds_comp1 of the comparison circuit 122 is inverted. Accordingly, the monitoring circuit 12 detects the start of the change in the voltage drop Vds across the switching element SWH and starts to monitor the time Tfall. That is, when the comparison result Vds_comp1 of the comparison circuit 122 transition from an H level to an L level in a state where the comparison result Vds_comp2 of the comparison circuit 123 is maintained at an L level, the measurement circuit 124 shifts an enable signal of the counter 124d (refer to FIG. 3) to an H level. As a result, the measurement circuit 124 starts a count operation of the time Tfall by the counter 124d.

At timing t6, the voltage drop Vds across the switching element SWH falls below the threshold voltage Vth2, and the comparison result Vds_comp2 of the comparison circuit 123 is inverted. Accordingly, the monitoring circuit 12 detects the end of the change in the voltage drop Vds across the switching element SWH and ends the monitoring of the time Tfall. That is, when the comparison result Vds_comp2 of the comparison circuit 123 transitions from an L level to an H level in a state where the comparison result Vds_comp1 of the comparison circuit 122 is maintained at an L level, the measurement circuit 124 shifts an enable signal of the counter 124d (refer to FIG. 3) to an L level. As a result, the measurement circuit 124 ends the count operation of the time Tfall by the counter 124d and outputs the count value to the control circuit 13.

The control circuit 13 acquires the time Tfall based on the count value, calculates the slew rate SRfall based on the time Tfall, and acquires a deviation from the target value SRt of the slew rate SRfall, and acquires the amount of correction ΔI21 based on the deviation. The amount of correction ΔI21 is reflected on the control during the next fall of the waveform.

At timing t7, the control circuit 13 changes the target value from I21 to I31 and controls the current source 111 such that the target value is I31. An amplitude absolute value of I31 is more than an amplitude absolute value of I21. Accordingly, the current Ig_High_side_U flowing to the gate of the switching element SWH increases from I21 to I31, and the gate-to-source voltage Vgs of the switching element SWH more sharply increases. Accordingly, the switching element SWH is maintained in an ON state, and the voltage drop Vds across the switching element SWH is maintained at zero. Next, the current Ig_High_side_U is maintained at I31. The gate-to-source voltage Vgs of the switching element SWH continuously increases and is maintained at a predetermined value. At this time, the voltage drop Vds across the switching element SWH is maintained at zero.

At timing t8, the control circuit 13 changes the target value from I31 to zero and turns off the switch 112.

As illustrated in FIG. 5, the control circuit 13 controls the current value of the current source 111 to be I11 in a period TP11 from the timing t3 to the timing t4, controls the current value of the current source 111 to be I21 that is lower than I11 and on which the amount of correction of the slew rate control is reflected in a period TP21 from the timing t4 to the timing t7, and controls the current value of the current source 111 to be I31 that is higher than I11 in a period TP31 from the timing t7 to the timing t8. As a result, while optimizing the slew rate control in the period TP21, the drive capability in the periods TP11 and TP31 can be provided.

At timing t9 illustrated in FIG. 4, the signal PWM_U transitions from an H level to an L level. Accordingly, the operation of (Low side ON) starts.

At timing t10, in the driver circuit 14-1 on the high side, the switch 113 is turned on while the switch 112 is maintained in an OFF state. The control circuit 13 controls the current source 114 such that the target value is I12. As a result, as illustrated in FIG. 6, the current $I_{114}$ of the current source 114 decreases from zero to I12 and is maintained at I12. I12 is a current in the direction flowing from the gate, and is a negative current. Accordingly, a current Ig_High_side_U flowing from the gate of the switching element SWH decreases from zero to an absolute value of I12, and a gate-to-source voltage Vgs of the switching element SWH gradually decreases. Then, while the current Ig_High_side_U is maintained at I12, the gate-to-source voltage Vgs of the switching element SWH continuously decreases.

At timing t11, the control circuit 13 changes the target value from I12 to I22 and controls the current source 114 such that the target value is I22. An amplitude absolute value of I22 is less than an amplitude absolute value of I12. I22 is a value obtained adding an amount of correction ΔI22' that is previously acquired to an amount of current I22' during the previous fall of the waveform. Accordingly, a current Ig_High_side_U flowing from the gate of the switching element SWH decreases from an absolute value of I12 to an absolute value of I22, and a gate-to-source voltage Vgs of the switching element SWH more gently decreases. Accordingly, the switching element SWH starts to be turned off, and the voltage drop Vds across the switching element SWH starts to increase. Then, while the current Ig_High_side_U is maintained at I22, the gate-to-source voltage Vgs of the switching element SWH continuously gently decreases, and the voltage drop Vds across the switching element SWH continuously increases.

At this time, the monitoring circuit 12 monitors a change start of the voltage drop Vds across the switching element SWH. The difference circuit 121 acquires a difference voltage between a voltage of one end of the switching element SWH and a voltage of the other end of the switching element SWH. The comparison circuit 122 compares the difference voltage to the threshold voltage Vth1 and outputs an L level as a comparison result Vds_comp1. The comparison circuit 123 compares the difference voltage to the threshold voltage Vth2 and outputs an H level as a comparison result Vds_comp2.

At timing t12, the voltage drop Vds across the switching element SWH exceeds the threshold voltage Vth2, and the comparison result Vds_comp2 of the comparison circuit 123 is inverted. Accordingly, the monitoring circuit 12 detects a change start of the voltage drop Vds across the switching element SWH and starts to monitor the time Trise. That is, when the comparison result Vds_comp2 of the comparison circuit 123 transitions from an H level to an L level in a state where the comparison result Vds_comp1 of the comparison circuit 122 is maintained at an L level, the measurement circuit 124 shifts an enable signal of the counter 124d (refer to FIG. 3) to an H level. As a result, the measurement circuit 124 starts a count operation of the time Trise by the counter 124d.

At timing t13, the voltage drop Vds across the switching element SWH exceeds the threshold voltage Vth1, and the comparison result Vds_comp1 of the comparison circuit 122 is inverted. Accordingly, the monitoring circuit 12 detects the end of the change in the voltage drop Vds across the switching element SWH and ends the monitoring of the time Trise. That is, when the comparison result Vds_comp1 of the comparison circuit 122 transitions from an L level to an H level in a state where the comparison result Vds_comp2 of the comparison circuit 123 is maintained at an L level, the measurement circuit 124 shifts an enable signal of the counter 124d (refer to FIG. 3) to an L level. As a result, the measurement circuit 124 ends the count operation of the time Trise by the counter 124d and outputs the count value to the control circuit 13.

The control circuit 13 acquires the time Trise based on the count value, calculates the slew rate SRrise based on the time Trise, and acquires a deviation from the target value SRt of the slew rate SRrise, and acquires the amount of correction ΔI22 based on the deviation. The amount of correction ΔI22 is reflected on the control during the next rise of the waveform.

At timing t14, the control circuit 13 changes the target value from I22 to I32 and controls the current source 114 such that the target value is I32. An amplitude absolute value of I32 is more than an amplitude absolute value of I22. Accordingly, a current Ig_High_side_U flowing from the gate of the switching element SWH increases from an absolute value of I22 to an absolute value of I32, and a gate-to-source voltage Vgs of the switching element SWH more sharply decreases to zero. Accordingly, the switching element SWH is maintained in an OFF state, and the voltage Vds across the switching element SWH is maintained at a power supply level. Then, while the current Ig_High_side_U is maintained at I32, the gate-to-source voltage Vgs of the switching element SWH is maintained at zero. At this time, the voltage drop Vds across the switching element SWH is maintained at the power supply level.

At timing t15, the control circuit 13 changes the target value from I32 to zero and turns off the switch 113.

As illustrated in FIG. 6, the control circuit 13 controls the current value of the current source 114 to be I12 in a period TP12 from the timing t10 to the timing t11, controls the current value of the current source 114 to be I22 of which the absolute value is lower than I12 and on which the amount of correction of the slew rate control is reflected in a period TP22 from the timing t11 to the timing t14, and controls the current value of the current source 114 to be I32 of which the absolute value is higher than I12 in a period TP32 from the timing t14 to the timing t15. As a result, while optimizing the slew rate control in the period TP22, the drive capability in the periods TP12 and TP32 can be provided.

At timing t16, the OFF operation of the switching element SWH is completed, and the switching element SWH is maintained in an OFF state. Accordingly, a signal Low_side_U transitions from an L level to an H level. Accordingly, the monitoring circuit 12 and the control circuit 13 in the driver circuit 14-2 on the low side are activated. At this time, a period (for example, a period from t14 to t16) immediately before the timing t16 is secured as a dead time.

As described above, in the driver circuit 10 according to the embodiment, a period of time from the start to the end of a change in a voltage drop across the switching element SW is monitored, and current values of the current sources 111 and 114 are controlled based on the monitored period of time such that a slew rate of the voltage drop across the switching element SW approaches a target value. As a result, even if characteristics such as a capacitance value change depending on selection/variation of the switching element or current/voltage/temperature dependence, the slew rate during a change in the voltage drop across the switching element SW can be controlled to be in an appropriate range, and the switching element can be appropriately driven. Accordingly, EMI noise can be reduced to be in an allowable range and power loss can be reduced to be a request level or lower.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A driver circuit comprising:
a drive circuit including a first current source and configured to drive a switching element when the first current source is connected to a control terminal of the switching element;
a monitoring circuit configured to monitor a period of time from a start to an end of a change in a voltage drop across the switching element, the monitoring circuit including
a difference circuit configured to acquire a difference voltage between a voltage of one end of the switching element and a voltage of the other end of the switching element,
a first comparison circuit configured to compare the difference voltage to a first threshold voltage,
a second comparison circuit configured to compare the difference voltage to a second threshold voltage lower than the first threshold voltage, and
a measurement circuit configured to measure the period of time from the start to the end of the change in the voltage drop across the switching element based on a comparison result of the first comparison circuit and a comparison result of the second comparison circuit; and
a control circuit configured to control a current value of the first current source based on the monitored period of time such that a slew rate of the voltage drop across the switching element approaches a target value.

2. The driver circuit according to claim 1, wherein
the monitored period of time is a period of time for the voltage drop across the switching element to fall from the first threshold voltage to below the second threshold voltage, and
the control circuit is configured to control the current value of the first current source such that the slew rate of the voltage drop across the switching element approaches a first target value.

3. The driver circuit according to claim 2, wherein
the monitored period of time is a period of time for the voltage drop across the switching element to rise from the second threshold voltage to above the first threshold voltage, and
the control circuit is configured to control the current value of the first current source such that the slew rate of the voltage drop across the switching element approaches a second target value.

4. The driver circuit according to claim 1, wherein
the monitoring circuit is configured to monitor the period of time from the start to the end of the change in the voltage drop across the switching element during a first period, and the control circuit is configured to control the current value of the first current source to equal a first current value during the first period and to control the current value of the first current source to equal a third current value higher than the first current value during a second period following the first period.

5. The driver circuit according to claim 1, wherein
the monitoring circuit is configured to monitor the period of time from the start to the end of the change in the voltage drop across the switching element during a first period, and
the control circuit is configured to control the current value of the first current source to equal a first current value during the first period and to control the current value of the first current source to equal a fourth current value higher than the first current value during a third period prior to the first period.

6. The driver circuit according to claim 1, wherein
the monitoring circuit is configured to monitor the period of time from the start to the end of the change in the voltage drop across the switching element during a first period, and
the control circuit is configured to control the current value of the first current source to equal a first current value during the first period, to control the current value of the first current source to equal a fourth current value higher than the first current value during a third period prior to the first period, and to control the current value of the first current source to equal a third current value higher than the first current value during a second period following the first period.

7. The driver circuit according to claim 1, wherein
the monitoring circuit is configured to monitor the period of time from the start to the end of the change in the voltage drop across the switching element during a first period, and the current value of the first current source is controlled based on the period of time monitored during the first period such that the slew rate of the voltage drop across the switching element approaches a first target value, and
the monitoring circuit is configured to monitor the period of time from the start to the end of the change in the voltage drop across the switching element during a fourth period following the first period, and the current value of the first current source is controlled based on the period of time monitored during the fourth period such that the slew rate of the voltage drop across the switching element approaches a second target value.

8. A power conversion system comprising:
a switching circuit including a switching element; and
a driver circuit including:
a drive circuit including a first current source and configured to drive the switching element when the first current source is connected to a control terminal of the switching element;
a monitoring circuit configured to monitor a period of time from a start to an end of a change in a voltage drop across the switching element, the monitoring circuit including
a difference circuit configured to acquire a difference voltage between a voltage of one end of the switching element and a voltage of the other end of the switching element,
a first comparison circuit configured to compare the difference voltage to a first threshold voltage, a second comparison circuit configured to compare the difference voltage to a second threshold voltage lower than the first threshold voltage, and a measurement circuit configured to measure the period of time from the start to the end of the change in the voltage drop across the switching element based on a comparison result of the first comparison circuit and a comparison result of the second comparison circuit; and a control circuit configured to control a current value of the first current source based on the monitored period of time such that a slew rate of the voltage drop across the switching element approaches a target value.

9. The power conversion system according to claim 8, wherein the monitored period of time is a period of time for the voltage drop across the switching element to fall from the first threshold voltage to below the second threshold voltage, and the control circuit is configured to control the current value of the first current source such that the slew rate of the voltage drop across the switching element approaches a first target value.

10. The power conversion system according to claim 9, wherein the monitored period of time is a period of time for the voltage drop across the switching element to rise from the second threshold voltage to above the first threshold voltage, and the control circuit is configured to control the current value of the first current source such that the slew rate of the voltage drop across the switching element approaches a second target value.

11. The power conversion system according to claim 8, wherein the monitoring circuit is configured to monitor the period of time from the start to the end of the change in the voltage drop across the switching element during a first period, and the control circuit is configured to control the current value of the first current source to equal a first current value during the first period and to control the current value of the first current source to equal a third current value higher than the first current value during a second period following the first period.

12. The power conversion system according to claim 8, wherein the monitoring circuit is configured to monitor the period of time from the start to the end of the change in the voltage drop across the switching element during a first period, and the control circuit is configured to control the current value of the first current source to equal a first current value during the first period and to control the current value of the first current source to equal a fourth current value higher than the first current value during a third period prior to the first period.

13. The power conversion system according to claim 8, wherein the monitoring circuit is configured to monitor the period of time from the start to the end of the change in the voltage drop across the switching element during a first period, and the control circuit is configured to control the current value of the first current source to equal a first current value during the first period, to control the current value of the first current source to equal a fourth current value higher than the first current value during a third period prior to the first period, and to control the current value of the first current source to equal a third current value higher than the first current value during a second period following the first period.

14. The power conversion system according to claim 8, wherein the monitoring circuit is configured to monitor the period of time from the start to the end of the change in the voltage drop across the switching element during a first period, and the current value of the first current source is controlled based on the period of time monitored during the first period such that the slew rate of the voltage drop across the switching element approaches a first target value, and the monitoring circuit is configured to monitor the period of time from the start to the end of the change in the voltage drop across the switching element during a fourth period following the first period, and the current value of the first current source is controlled based on the period of time monitored during the fourth period such that the slew rate of the voltage drop across the switching element approaches a second target value.

15. A method of driving a switching circuit of a power conversion system, said method comprising:

driving a switching element of the switching circuit by connecting a first current source to a control terminal of the switching element;

acquiring a difference voltage between a voltage of one end of the switching element and a voltage of the other end of the switching element;

comparing the difference voltage to a first threshold voltage and comparing the difference voltage to a second threshold voltage lower than the first threshold voltage;

measuring a period of time from a start to an end of a change in a voltage drop across the switching element based on results of comparing the difference voltage to the first threshold voltage and comparing the difference voltage to the second threshold voltage;

monitoring the period of time from the start to the end of the change in the voltage drop across the switching element; and controlling a current value of the first current source based on the monitored period of time such that a slew rate of the voltage drop across the switching element approaches a target value.

16. The method of claim 15, wherein the monitored period of time is a period of time for the voltage drop across the switching element to fall from the first threshold voltage to below the second threshold voltage, and the current value of the first current source is controlled such that the slew rate of the voltage drop across the switching element approaches a first target value.

17. The method of claim 15, wherein the monitored period of time is a period of time for the voltage drop across the switching element to rise from the second threshold voltage to above the first threshold voltage, and the current value of the first current source is controlled such that the slew rate of the voltage drop across the switching element approaches a second target value.

* * * * *